United States Patent [19]

Bourgeois

[11] Patent Number: 4,982,654
[45] Date of Patent: Jan. 8, 1991

[54] ELECTRIC KETTLE

[75] Inventor: Christian Bourgeois, Dampierre, France

[73] Assignee: Seb S.A., Selongey, France

[21] Appl. No.: 469,188

[22] Filed: Jan. 24, 1990

[30] Foreign Application Priority Data

Jan. 27, 1989 [FR] France .................................. 89 01016
Mar. 8, 1989 [FR] France .................................. 89 03036

[51] Int. Cl.$^5$ .......................... A47J 27/21; A47J 27/62
[52] U.S. Cl. ..................................... 99/323.3; 99/281; 99/293; 99/331; 219/435; 219/437; 219/441
[58] Field of Search ................ 99/275, 279, 281, 280, 99/285, 288, 290, 293, 300, 316, 323, 323.3, 330, 331, 468; 219/441, 435, 437, 318, 311, 328

[56] References Cited

U.S. PATENT DOCUMENTS

| | | | |
|---|---|---|---|
| 313,469 | 3/1885 | Byler | 99/293 |
| 3,024,718 | 3/1962 | Morrison | 99/323.3 |
| 3,103,872 | 9/1963 | Kircher | 99/323.3 |
| 3,469,522 | 9/1969 | Prosen | 99/281 |
| 3,682,089 | 8/1972 | Unger et al. | 219/436 |
| 3,969,610 | 7/1976 | Ratti et al. | 219/441 |
| 4,544,830 | 10/1985 | Miller | 219/437 |
| 4,557,187 | 12/1985 | DePonti | 99/279 |
| 4,645,910 | 2/1987 | Chhatwal | 219/437 |
| 4,675,508 | 6/1987 | Miyaji et al. | 219/437 |
| 4,715,269 | 12/1987 | Stoner | 99/281 |

FOREIGN PATENT DOCUMENTS

| | | |
|---|---|---|
| 0254482 | 1/1988 | European Pat. Off. . |
| 2446576 | 8/1980 | France . |
| 2592293 | 7/1987 | France . |
| 2055248 | 2/1981 | United Kingdom . |
| 2185150 | 7/1987 | United Kingdom . |
| 2200034 | 7/1988 | United Kingdom . |

Primary Examiner—Timothy F. Simone
Attorney, Agent, or Firm—Young & Thompson

[57] ABSTRACT

An automatic electric kettle of improved design comprises a water vessel (1) closed by a lid (2), an electric heating resistor (3) fixed on the bottom wall (4) of the vessel, and a steam flow duct (14) which extends to the full height of the vessel. The lower end of the duct has its opening opposite to the temperature-sensitive element (15) of the temperature limiter (12).

17 Claims, 3 Drawing Sheets

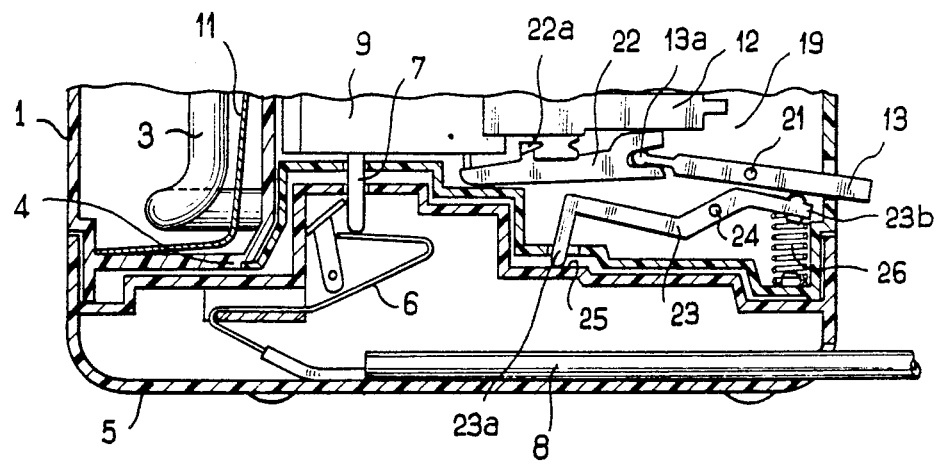
FIG_2
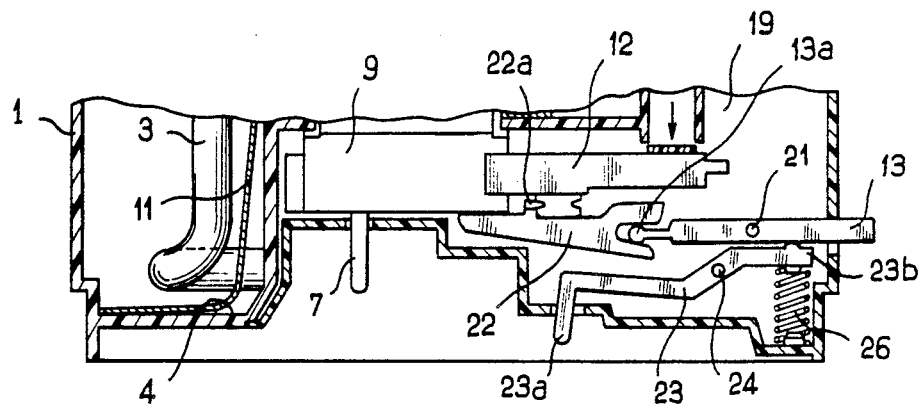
FIG_3
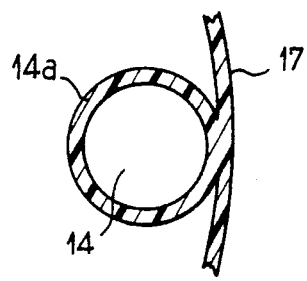
FIG_4

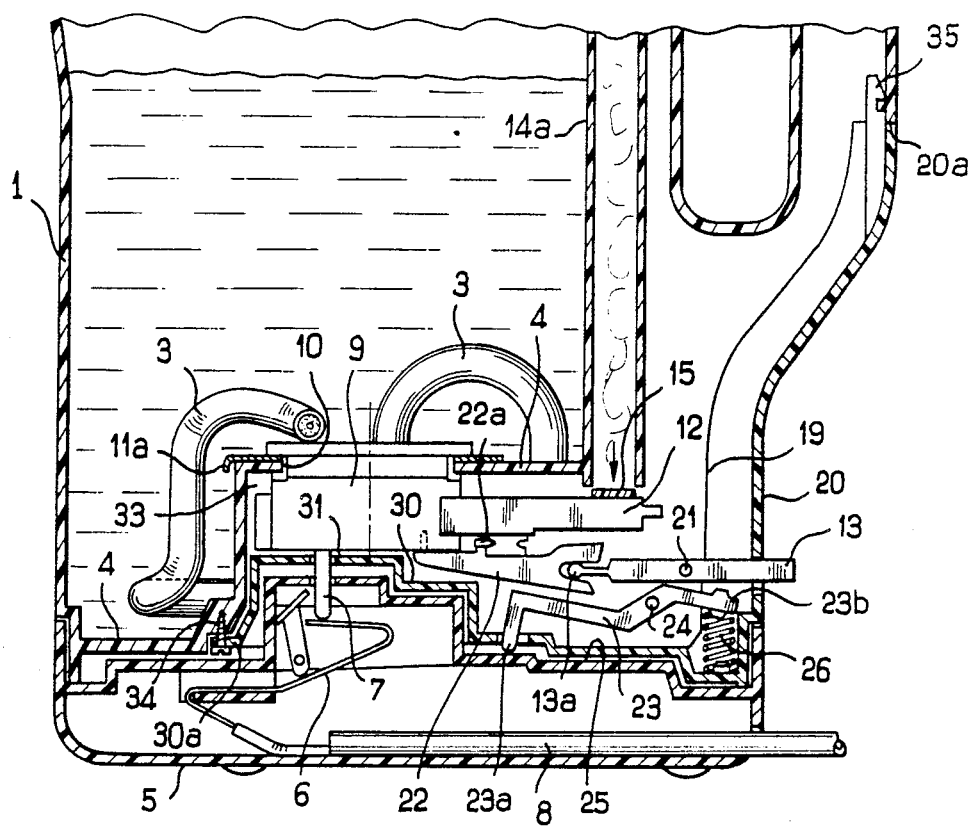
FIG_5
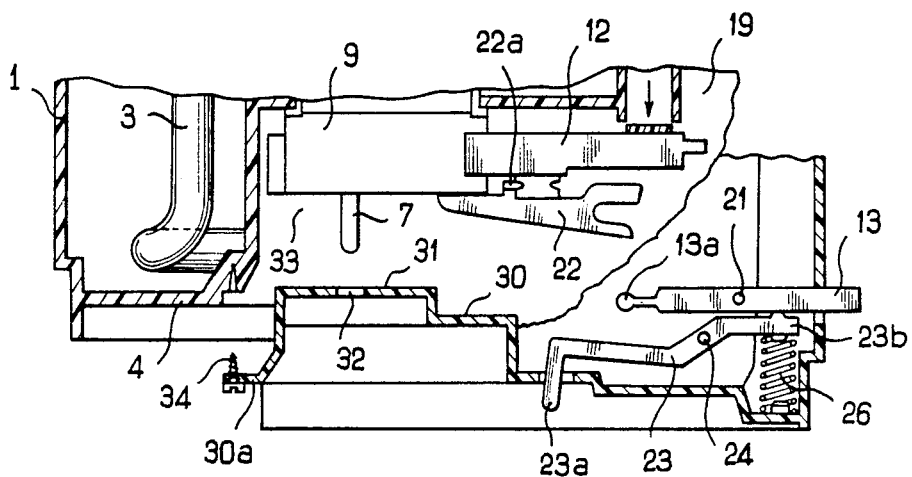
FIG_6

ELECTRIC KETTLE

BACKGROUND OF THE INVENTION

1. Field of the Invention

The present invention relates to an improved electric kettle.

2. Description of the Prior Art

A known electric kettle disclosed in particular in French Pat. No. 2,592,293 to the present Applicant comprises a water vessel closed by a lid and fitted with an electric heating resistor which is fixed on the bottom wall of the vessel. Said bottom wall rests in a removable manner on a base provided with electric connection means adapted to cooperate with complementary connection means attached to the bottom wall of the vessel.

The water vessel also comprises a temperature limiter which is sensitive to the temperature of the steam and adapted to cut-off the power supply at a predetermined temperature of the steam and a switch is provided for turning-on the supply of current to the resistor when the vessel is placed on the base.

In this design, the temperature limiter is placed at the top of the kettle.

The temperature-sensitive element constituted by a bimetallic strip is therefore directly exposed to the steam which is formed at the top of the vessel and which is at high temperature (in the vicinity of 100° C.).

This temperature limiter cuts-off the supply of current to the heating resistor when the desired temperature is reached (in the vicinity of 100° C.).

A control push-button serves to reset the temperature limiter. To this end, it is necessary to wait until the temperature-sensitive element of the limiter has cooled to a sufficient extent. Since this element is at a high temperature (at the water vaporization level), this element cools very slowly, with the result that it is necessary to wait too long in order to reset the temperature limiter.

There has also been described in European Pat. No. 254,482 a kettle removably mounted on a base, the upper portion of the vessel being provided with a control push-button for turning-on or turning-off the supply of current to the heating resistor. This control push-button cooperates with a link-rod system which is located within a lateral space of the vessel and serves to actuate a switching device located beneath the base of the vessel.

A link-rod system of this type is complex and affects the cost of manufacture of the kettle.

The aim of the present invention is to overcome the disadvantages of known designs.

SUMMARY OF THE INVENTION

The invention is accordingly directed to an electric kettle comprising a water vessel closed by a lid, said vessel being provided with an electric heating resistor fixed on the bottom wall of said vessel, said bottom wall being removably supported on a base provided with electric connection means adapted to cooperate with complementary connection means secured to the bottom wall of the vessel, said vessel being also provided with a temperature limiter which is sensitive to the temperature of steam and adapted to cut-off the power supply at a predetermined temperature of the steam and a switch being provided for turning-on the supply of current to the resistor when the vessel is placed on the base.

According to the invention, said kettle is distinguished by the fact that the vessel has a steam-flow duct which extends substantially to the full height of the vessel and projects within this latter and that the lower end of said duct has its opening opposite to the temperature-sensitive element of the temperature limiter.

It has been found that, by virtue of said steam duct which serves to bring the steam into contact with the sensitive element of the limiter at a point located in the lower portion of the kettle, said element cools at a much higher rate than in known designs, with the result that the temperature limiter can be reset a very short time after it has been released.

Moreover, the fact that the duct projects within the vessel makes it possible to put said duct into intimate thermal contact with the hot water and the steam contained in the vessel, which is conducive to efficient operation of the temperature limiter.

In a preferred embodiment of the invention, the switch for initiating the supply of current to the resistor has a control lever which extends within a space located beneath the bottom wall of the vessel and which projects from the side wall of the vessel.

This arrangement makes it possible to dispense with the complex link-rod system of the known design aforesaid.

Preferably, the control lever is adapted to cooperate with means which bring it automatically to the position of interruption of the current supply to the resistor when the vessel is lifted from the base.

This arrangement makes it possible to avoid any risk of arcing between the connection means of the bottom wall of the vessel and of the base when said vessel is separated from said base.

BRIEF DESCRIPTION OF THE DRAWINGS

FIG. 2 is a sectional view of the lower portion of the kettle, this latter being in the "on" position.

FIG. 3 is a sectional view of the lower portion of the water vessel of the kettle, said vessel having been removed from its base.

FIG. 4 is a sectional view taken along the plane IV—IV of FIG. 1.

FIG. 5 is a sectional view of the lower portion of the kettle in a preferred embodiment.

FIG. 6 is a view which is similar to that of FIG. 3, the removable wall being detached from the bottom wall of the vessel.

DESCRIPTION OF THE PREFERRED EMBODIMENTS

Figure 1:
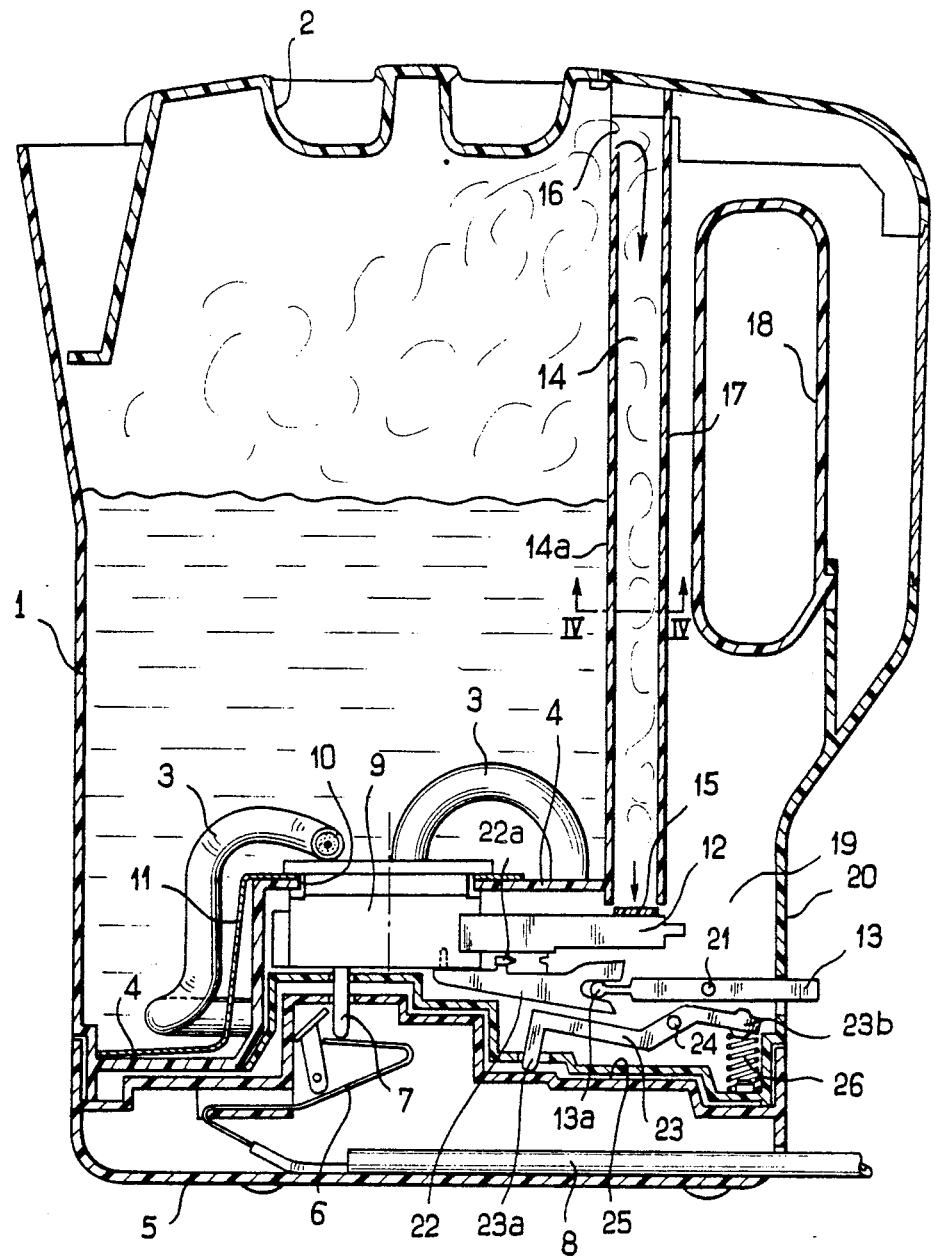
FIG. 1 is a longitudinal sectional view of a kettle in accordance with the invention, the kettle being in the "off" position.

In the embodiment of FIG. 1, the electric kettle of molded plastic comprises a water vessel 1 closed by a lid 2, said vessel being provided with an electric heating resistor 3 which is fixed on the bottom wall 4 of said vessel. Said bottom wall 4 is removably supported on a base 5 provided with electric connection means 6 adapted to cooperate with complementary connection means 7 secured to the bottom wall 4 of the vessel 1. The connection means 6 of the base include resilient metallic strips connected to a flexible cord 8 which is intended to be connected to the power supply. The connection means 7 of the vessel include metallic pins connected to the resistor 3 by means of a connection block 9 which is fixed in fluid-tight manner within an opening 10 formed in the bottom wall 4 of the vessel 1. Said bottom wall 4 is partly covered with a thermal protection plate 11 of sheet metal.

The vessel 1 is also provided with a temperature limiter 12 which is sensitive to the temperature of steam and adapted to cut-off the power supply at a predetermined temperature of the steam. In addition, a switch 13 is provided for turning-on the supply of current to the resistor 3 when the vessel 1 is placed on the base 5.

In accordance with the invention, the vessel 1 has a steam-flow duct 14 which extends substantially to the full height of said vessel 1.

The lower end of said duct 14 has its opening opposite to the temperature-sensitive bimetallic element 15 of the temperature limiter 12. Said duct emerges at its upper end within the vessel 1 in an opening 16 located in very close proximity to the lid 2.

Moreover, the duct 14 projects within the vessel 1 and practically its entire external surface 14a is exposed to the interior of the vessel 1. A very small fraction of said external surface is common with that portion of the external wall 17 of the vessel 1 which is adjacent to the vessel handle 18 (as shown in FIG. 4).

It is also apparent from FIG. 1 that the temperature-sensitive element 15 is located horizontally at a short distance from the bottom wall 4 of the vessel 1. The surface of said element 15 corresponds substantially to the cross-section of the duct 14.

Moreover, said element 15 is surrounded by a hollow space 19.

It is also apparent from FIG. 1 that the connector-pins 7 form part of a connection block 9 and that the temperature limiter 12 forms part of said block.

Furthermore, the switch 13 for controlling the supply of current to the resistor 3 has a substantially horizontal control lever which extends within a space 19 located beneath the bottom wall 4 of the vessel. Said lever 13 projects from the lower portion 20 of the side wall of the vessel 1 in order to be accessible to users.

Said control lever 13 is pivotally mounted on a pin 21 located within the vessel 1 and the end 13a of said lever which is remote from the exterior of the vessel is mounted in articulated relation to a member 22 which is capable of pivotal displacement about a pin 22a between a position (see FIG. 1) in which the supply of current to the resistor 3 is interrupted and a position (see FIG. 2) in which the current is supplied. The pivoting member 22 is stable in both positions.

The switching means controlled by the member 22 and contained in the block 9 are not shown since they are known per se. Similarly, the means for cooperation between the bimetallic element 15 and the member 22 are not illustrated. These means are well known, especially in kettles.

Moreover, the control lever 13 is adapted to cooperate with means which bring this latter automatically to the position in which the current supply to the resistor 3 is interrupted when the vessel 1 is removed from the base 5 as indicated in FIG. 3.

The means aforesaid include a second lever 23 which pivots about a pin 24, one end 23a of which projects from the bottom wall of the vessel 1 and bears on the top wall 25 of the base 5 when the vessel 1 is placed on this latter as shown in FIG. 1.

The other end 23b of the lever 23 is applied beneath the first lever 13 under the action of a spring 26 which thrusts said first lever 13 to the position of interruption of the current supply to the resistor 3 as soon as the vessel 1 is lifted from the base 5.

The operation of the kettle just described will now be explained.

In the position shown in FIG. 1, the lever 13 is in the "off" position. The end 23a of the lower lever 23 is applied against the base 5 and the end 23b of said lever is located in empty space by reason of the compression of the spring 26 resulting from the presence of the base 5.

Moreover, the member 22 is in the position of interruption of the current supply to the resistor.

In order to change-over to the "on" position, it is only necessary to press the projecting end of the lever 13 as indicated in FIG. 2. This movement produces a pivotal displacement of the member 22 to the position of turn-on of the current supply to the resistor 3.

From this moment onwards, the resistor 3 which is supplied with electric current heats the water contained in the vessel. The steam thus formed passes through the lateral duct 14 and flows in contact with the bimetallic element 15 before escaping to the exterior.

When the temperature of the element 15 attains the predetermined reference value (which can be distinctly lower than that of the steam at the top of the vessel), said element 15 releases the member 22 which cuts-off the supply of current to the resistor 3. The lever 13 then reverts to the "stop" position shown in FIG. 1.

Since the supply of current to the resistor 3 has been cut-off, the user can remove the vessel 1 from the base 5 in order to use the hot water without any attendant danger of arcing between the connector-pins 7 and the connecting strips 6.

In the position shown in FIG. 1, the bimetallic element 15 is not directly in contact with the interior of the vessel 1 and therefore cools rapidly. Said element can thus be reset very rapidly, which enables the user to obtain a fresh quantity of water at the optimum temperature without having to wait unduly.

Should the user inadvertently remove the vessel 1 from the base 5 before the element 22 has cut-off the supply of current to the resistor 3, that is, prior to release of the temperature limiter 12, the simple fact of lifting the vessel 1 has the effect of tilting the lower lever 23 under the action of the spring 26 by reason of the fact that the end 23a of said lever is no longer in contact with the wall 25 of the base. This tilting motion of the lever 23 (see FIG. 3) produces an upward displacement of the control lever 13 to the "stop" position. Thus, even in this case, arcing between the connector-pins 7 and the strips 6 is avoided.

In the embodiments shown in FIGS. 5 and 6, a wall 30 is removably fixed beneath the bottom wall 4 of the water vessel. The top face 31 of said wall 30 extends beneath the connection block 9 on which the heating resistor 3 is fixed. Said wall 30 is provided with openings 32 through which the connector-pins 7 of the block 9 are intended to pass.

The top face 31 of the wall 30 is located at the summit of a protuberance which is engaged within a recess 33 of the bottom wall 4 of the vessel 1.

Moreover, the wall 30 forms part of a substantially L-shaped member, one wing 20 of which extends over the side wall of the kettle, the end portion 20a of said wing being removably attached to said side wall beneath the handle of the kettle.

The other wing of the L-shaped member supports the levers 13 and 23 as well as the spring 26.

It is apparent from FIG. 6 that the entire L-shaped member is detachable from the bottom wall 4 of the kettle.

The end portion 30a of the wing provided with the protuberance is secured to the bottom wall 4 of the vessel by means of a screw 34 whilst the end portion 20a of the other wing is fixed beneath the handle of the kettle by means of a hook 35.

The bottom wall 4 of the vessel 1 is provided around the connection block 9 with a washer 11a which replaces the sheet metal plate 11 of the embodiment described earlier.

The technical advantages of the wall 30, 31 are as follows:

As shown in FIG. 5, the connection block 9 is fitted between the two walls 4 and 31. Thus, in the event of overheating (due simultaneously to the absence of water and to non-operation of the dry cut-out thermostat), the connection block 9 does not undergo any downward displacement as a result of softening of the plastic material of the bottom wall 4 but remains in position while bearing on the wall 31. This arrangement has made it possible to dispense with the sheet metal plate 11 almost entirely and to reduce this latter to a simple washer 11a.

As will be readily apparent, the invention is not limited to the examples of construction which have been described in the foregoing and any number of modifications can be made in these examples without thereby departing either from the scope or the spirit of the invention.

What is claimed is:

1. An electric kettle comprising a water vessel (1) closed by a lid (2), said vessel being provided with an electric heating resistor (3) fixed on the bottom wall (4) of said vessel, said bottom wall (4) being removably supported on a base (5) provided with electric connection means (6) adapted to cooperate with complementary connection means (7) secured to the bottom wall (4) of the vessel, said vessel (1) being also provided with a temperature limiter (12) which is sensitive to the temperature of steam and adapted to cut-off the power supply at a predetermined temperature of the steam and a switch (13) being provided for turning-on the supply of current to the resistor when the vessel (1) is placed on the base (5), wherein the vessel (1) has a steam-flow duct (14) which extends substantially to the full height of the vessel and projects within said vessel, and wherein the lower end of said duct (14) has its opening opposite to the temperature-sensitive element (15) of the temperature limiter (12).

2. A kettle according to claim 1, wherein practically the entire external surface (14a) of the duct (14) is exposed to the interior of the vessel (1).

3. A kettle according to claim 1, wherein the temperature-sensitive element (15) is located slightly below the bottom wall (4) of the vessel.

4. A kettle according to claim 1, wherein the electric connection means (7) which are secured to the bottom wall (4) of the vessel form part of a connection block (9) and wherein the temperature limiter (12) forms part of said block.

5. A kettle according to claim 1, wherein the switch for turning-on the supply of current to the resistor has a control lever (13) which extends within a space (19) located beneath the bottom wall (4) of the vessel and which projects from the side wall (20) of said vessel.

6. A kettle according to claim 5, wherein the control lever (13) is pivotally mounted on a pin (21) located within the vessel and that end (13a) of said control lever which is remote from the exterior of the vessel is mounted in articulated relation to a member (22) which is capable of pivotal displacement between a position in which the current is supplied to the resistor and a position in which said supply is interrupted.

7. A kettle according to claim 6, wherein the pivoting member (22) is stable in both positions.

8. A kettle according to claim 6, wherein the pivoting member (22) is associated with the temperature limiter (12).

9. A kettle according to claim 5, wherein the control lever (13) is adapted to cooperate with means (23) which bring it automatically to the position of interruption of the current supply to the resistor (3) when the vessel (1) is removed from the base (5).

10. A kettle according to claim 9, wherein the means aforesaid comprise a second pivoting lever (23) having one end (23a) which projects from the bottom portion of the vessel and bears on the base (5) when the vessel is placed in position on said base while the other end (23b) of the lever (23) is applied beneath the first lever (13) under the action of a spring (26) which thrusts said first lever (13) into the position of interruption of the current supply when the vessel (1) is lifted from the base (5).

11. A kettle according to claim 4, wherein a wall (30) is removably fixed beneath the bottom wall (4) of the water vessel (1) and the top face (31) of said wall (30) extends beneath the connection block (9) on which the heating resistor (3) is fixed, said wall (30) being provided with openings (32) through which the connector pins (7) of the block (9) are intended to pass.

12. A kettle according to claim 11, wherein the top face (31) of said wall is located at the summit of a protuberance engaged within a recess (33) of the bottom wall (4) of the vessel.

13. A kettle according to claim 11, wherein said wall (30) forms part of a substantially L-shaped member, one wing (20) of which extends over the side wall of the kettle, the end portion (20a) of said wing being removably attached to said side wall.

14. A kettle according to claim 13, wherein the other wing of said L-shaped member is adapted to support the levers (13,23) as well as the spring (26).

15. A kettle according to claim 13, wherein the entire L-shaped member is detachable from the bottom wall (4) of the kettle.

16. A kettle according to claim 15, wherein the end portion (30a) of the wing which has the protuberance is attached to the bottom wall (4) of the vessel by means of a screw (34) while the end portion of the other wing is attached to the side wall of the kettle by means of a hook (35).

17. A kettle according to claim 11, wherein the bottom wall (4) of the vessel (1) is fitted with a washer (11a) around the connection block (9).

* * * * *